Jan. 8, 1924.
W. E. WILLIAMS
1,480,325
DOUBLE DISK WHEEL FOR AUTOMOBILES
Filed June 4, 1920
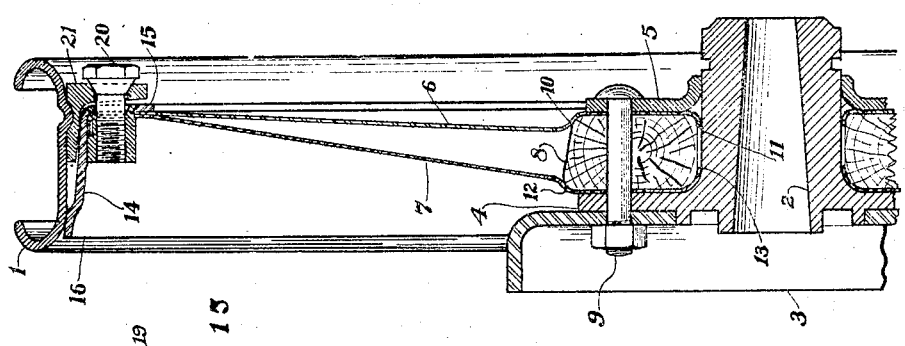
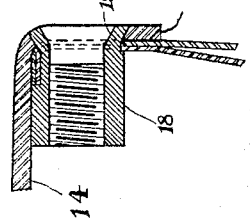
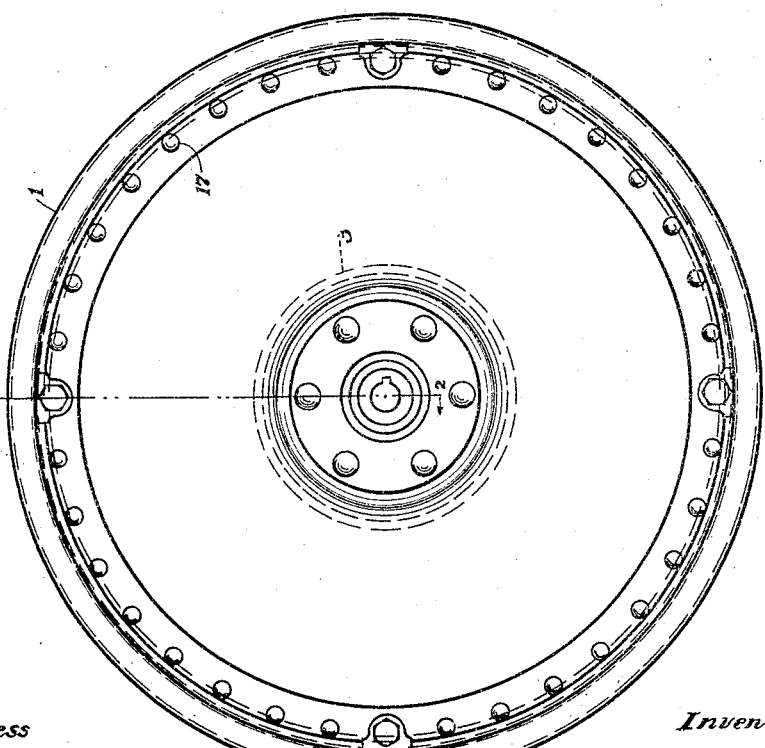
Witness
B. J. Bernhard.
Inventor
W. E. Williams Patented Jan. 8, 1924.

1,480,325

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

DOUBLE-DISK WHEEL FOR AUTOMOBILES.

Application filed June 4, 1920. Serial No. 386,443.

*To all whom it may concern:*

Be it known that I, WILLIAM ERASTUS WILLIAMS, a citizen of the United States, a resident of Chicago, in the county of Cook and State of Illinois, have invented a new and useful Improvement in Double-Disk Wheels for Automobiles, of which the following is a specification.

The object of my invention is to make a very stiff and very light disk wheel composed of two disks shaped and fitted in an automobile wheel in a manner to produce an inexpensive wheel offering great resistance to side strains.

Reference will be had to the accompanying drawings, in which Figure 1 is a front elevation of my wheel.

Figure 2 is a sectional elevation on a larger scale than that of Figure 1.

Figure 3 is a detail involved in the fastening of the rim.

In the drawing 1 indicates the ordinary rim of the clincher type used in automobiles, here shown in the demountable pattern. 2 indicates the ordinary hub, here shown as the rear hub. 3 indicates the ordinary brake drum. The hub 2 has a fixed rear or inner flange 4 and a detachable front or outer flange 5. The wheel body consists of a front disk 6 and a rear disk 7, between which at the hub is a spacer or filler block 8 of wood or other suitable material. A series of bolts 9 bind together the parts 3, 4, 5, 6, 7, 8, which together occupy the same space normally occupied by the spokes of an artillery wheel construction.

The front disk 6 fits the outer side face of the block 8 and is bent inward at 10, 11 to engage the inner and outer peripheral faces of the block. The rear disk is similarly arranged, with offsets or shoulders 12, 13 which engage the same peripheral surfaces on the opposite side of the spacer.

This method of embracing the filler block 8 permits the said block to be made out of a single piece of lumber if desired and no matter if the lumber cracks or splits it will still be retained within the embrace of the two plates 6 and 7, by reason of the shoulder insets or curved annular portions 10 and 11 of the front disk and 12 and 13 of the rear disk.

The curved or inset portions 10 and 12 furnish a bearing on the outer face of the insert block 8 and thus strains acting toward the hub are received at the periphery of the spacer 8, and this as well as the disks at this point having a far greater circumference than at the hub, strains which might rupture the disks if concentrated at the smaller hub circle are carried with safety.

At the rim margin of the disks 6 and 7 I bring the two disks together and secure them to a rim or felloe band 14 which has an inward projecting flange 15 and a flange or inner edge 16, the latter furnishing abutment or support for the edge of the rim 1.

The two disks and the flange 15 of the rim 14 are secured together by a series of rivets 17 which secures the rim 14 and disks 6 and 7 in substantially a unitary structure. At intervals around the rim as desired, I fasten in a series of nuts 18 which are secured in place by having their outer ends 19 flanged out into counter sunk apertures in the flange 15 of the rim 14. These nuts are used for securing a series of studs or screws 20 which pass through a series of lugs 21 which hold the demountable rim 1 on to the rim or felloe 14, thus producing what is called a wheel having a demountable rim equipment.

The lugs 21 are substantially wedges which secure the rim 1 on to the felloe 14 and are here shown of a slightly different construction from the ordinary wedge clips used with demountable rims.

However, with my rim 14 as shown, the ordinary demountable rim clips may be used.

The arrangement of the two disks connecting to the flanged rim or felloe 14 produces a very strong construction and yet a very light one to be secured with this type of wheel.

What I claim is:—

1. The combination with a hub, of two wheel disks widely separated at the hub and outwardly converging to meet at a short distance within the circle of a felloe body and extend outward, from the line of meeting, in annular contact, and means for rigidly binding together at short intervals the annular portions thus in contact.

2. The combination with an annular felloe member having at one side a broad, plane, annular, inwardly-extending flange, of two disks having plane peripheral zones overlapping each other and said flange and bent laterally in contact with the inner side of said member, means rigidly uniting said zones at short intervals, said means securing the united zones to said flange, and means for detachably securing rim-attaching wedges to said flange and zones.

3. In a wheel of the class described, two dished disks spaced apart at the hub and joined together at their outer margins and provided with a horizontal main felloe member with an inwardly extending flange and a series of threaded nuts passing through the two disks and secured into the inward projecting flange of the felloe whereby the said nuts furnish threads for a series of clip screws and at the same time assist in binding together the margins of the disks and the inwardly projecting flange of the felloe.

Signed at Chicago, in the county of Cook and State of Illinois, this twenty-fourth day of May, 1920.

WILLIAM ERASTUS WILLIAMS.

Witnesses:
F. ZOBEL,
A. J. CARTERS.